United States Patent
Grabowski

(10) Patent No.: US 8,392,935 B2
(45) Date of Patent: *Mar. 5, 2013

(54) UNIFORM EVENT HANDLING ACROSS MULTIPLE COMPUTING DEVICES

(75) Inventor: Michal Grabowski, Mountain View, CA (US)

(73) Assignee: Google Inc., Mountain View, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 13/073,676

(22) Filed: Mar. 28, 2011

(65) Prior Publication Data

US 2012/0254892 A1    Oct. 4, 2012

(51) Int. Cl.
G06F 9/44 (2006.01)
G06F 3/041 (2006.01)
G09G 5/00 (2006.01)

(52) U.S. Cl. ......... 719/318; 345/156; 345/163; 345/173

(58) Field of Classification Search ............... 719/318; 345/156, 163, 173

See application file for complete search history.

(56) References Cited

U.S. PATENT DOCUMENTS

| | | | |
|---|---|---|---|
| 5,491,495 A | 2/1996 | Ward et al. | |
| 6,654,955 B1 | 11/2003 | Kusnitz et al. | |
| 8,062,134 B2 | 11/2011 | Kelly et al. | |
| 8,151,279 B1 * | 4/2012 | Grabowski | 719/318 |
| 2002/0084991 A1 | 7/2002 | Harrison et al. | |
| 2006/0152496 A1 | 7/2006 | Knaven | |
| 2009/0235281 A1 | 9/2009 | Lu et al. | |
| 2009/0322687 A1 | 12/2009 | Duncan et al. | |
| 2010/0060571 A1 | 3/2010 | Chen et al. | |
| 2010/0070922 A1 | 3/2010 | DeMaio et al. | |
| 2010/0138780 A1 | 6/2010 | Marano et al. | |
| 2010/0199229 A1 | 8/2010 | Kipman et al. | |
| 2010/0283747 A1 | 11/2010 | Kukulski | |
| 2010/0299436 A1 | 11/2010 | Khalid et al. | |
| 2011/0141027 A1 | 6/2011 | Ghassabian | |
| 2011/0157062 A1 | 6/2011 | Kolmykov-Zotov et al. | |
| 2012/0169593 A1 * | 7/2012 | Mak et al. | 345/157 |

FOREIGN PATENT DOCUMENTS

EP    0394614 A2    10/1990

OTHER PUBLICATIONS

Search Report and Written Opinion for Dutch Patent Application No. 2007880, Feb. 24, 2012, 12 Pages.

* cited by examiner

*Primary Examiner* — Van Nguyen
(74) *Attorney, Agent, or Firm* — McDermott Will & Emery LLP

(57) ABSTRACT

A capture module is configured to provide input events of a particular type to an object of an application executing on a computer. The capture module receives an input event directed to the object of the application executing on the computer. The input event is generated responsive to a user interaction with an input device of the computer. If the input event is of the first type, the capture module translates the input event to a second type. The first type may be a touch input event and the second type may be a mouse input event. The capture module also selectively filters the input event of the second type and dispatches the input event of the second type to the object of the application responsive to the filtering.

24 Claims, 4 Drawing Sheets

UNIFORM EVENT HANDLING ACROSS MULTIPLE COMPUTING DEVICES

FIELD OF THE INVENTION

The present invention generally relates to the field of computing and more specifically to processing input events on computing devices such as mobile telephones and tablet computers.

BACKGROUND OF THE INVENTION

Web pages are created using a markup language that describes the structure of information in the page and can include interactive forms, embedded images, and other objects. The markup language can include embedded scripts (e.g., JAVASCRIPT code) which can affect the behavior of objects on the page. JAVASCRIPT, for example, provides developers with the ability to add event handlers to specific objects in a web page that respond to certain types of input events. Often, developers use the scripts to create event handlers for mouse events, such as mouse down or mouse up events indicating when a mouse button is pressed down or released. Thus, a user of an electronic device can use a mouse to interact with the web page.

Many recent types of electronic devices rely on touch-sensitive displays for user input instead of a mouse. The user uses a finger, stylus, or other object to interact with the web page. Typically, the electronic device will send these interactions to a web browser as touch events. If the scripts within a web page rendered by the browser are configured to receive only mouse events, the scripts will not process the touch events.

To remedy this problem, some electronic devices convert touch events to mouse events and send both types of events to the browser. However, touch events do not necessarily correlate with mouse events and this form of simple translation can have unintended consequences. Certain gestures, such as double-tap to zoom the page, delay the sending of mouse events to the browser because mouse events are not generated in the case of zooming the page. Consequently, the browser does not send mouse events corresponding to the first tap, until it identifies that the tap is not part of a double-tap. The browser accomplishes this by waiting for a second tap in a double-tap. Such anticipation of a second tap in a double-tap typically generates a lag time between the user's input and execution of an action in the web page. The wait can also result in multiple mouse events being sent to the browser in rapid succession once the device identifies the touch event. As a result, the user's interactions with the web page may feel sluggish or non-responsive.

SUMMARY OF THE INVENTION

Embodiments of the present disclosure include a method (and corresponding computer and computer-readable medium) for translating a first type of input event to a second type of input event. The method comprises receiving an input event directed to an object of an application executing on a computer. The input event is generated responsive to a user interaction with an input device of the computer. Responsive to the input event being of the first type, the input event is translated to an input event of the second type. The input event of the second type is selectively filtered and dispatched to the object of the application responsive to the filtering.

Embodiments of the computer comprise a non-transitory computer-readable storage medium storing executable computer program code comprising a reception module for receiving an input event directed to an object of an application executing on a computer. The input event is generated responsive to a user interaction with an input device of the computer. The computer program code further comprises a translation module for translating, responsive to the input event being of the first type, the input event of the first type to an input event of the second type. The computer program code additionally comprises a filtration module for selectively filtering the input event of the second type and a dispatch module for dispatching the input event of the second type to the object of the application responsive to the filtering. The computer also comprises a processor for executing the computer program code.

Embodiments of the computer-readable medium store executable computer program code comprising a reception module for receiving an input event directed to an object of an application executing on a computer. The input event is generated responsive to a user interaction with an input device of the computer. The computer program code further comprises a translation module for translating, responsive to the input event being of the first type, the input event of the first type to an input event of the second type. The computer program code additionally comprises a filtration module for selectively filtering the input event of the second type and a dispatch module for dispatching the input event of the second type to the object of the application responsive to the filtering. The computer also comprises a processor for executing the computer program code.

BRIEF DESCRIPTION OF THE DRAWINGS

Figure (FIG.) 1 is a high-level block diagram of a computer used to translate user input events according to one embodiment of the present disclosure.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

DETAILED DESCRIPTION OF THE INVENTION

Figure 1:
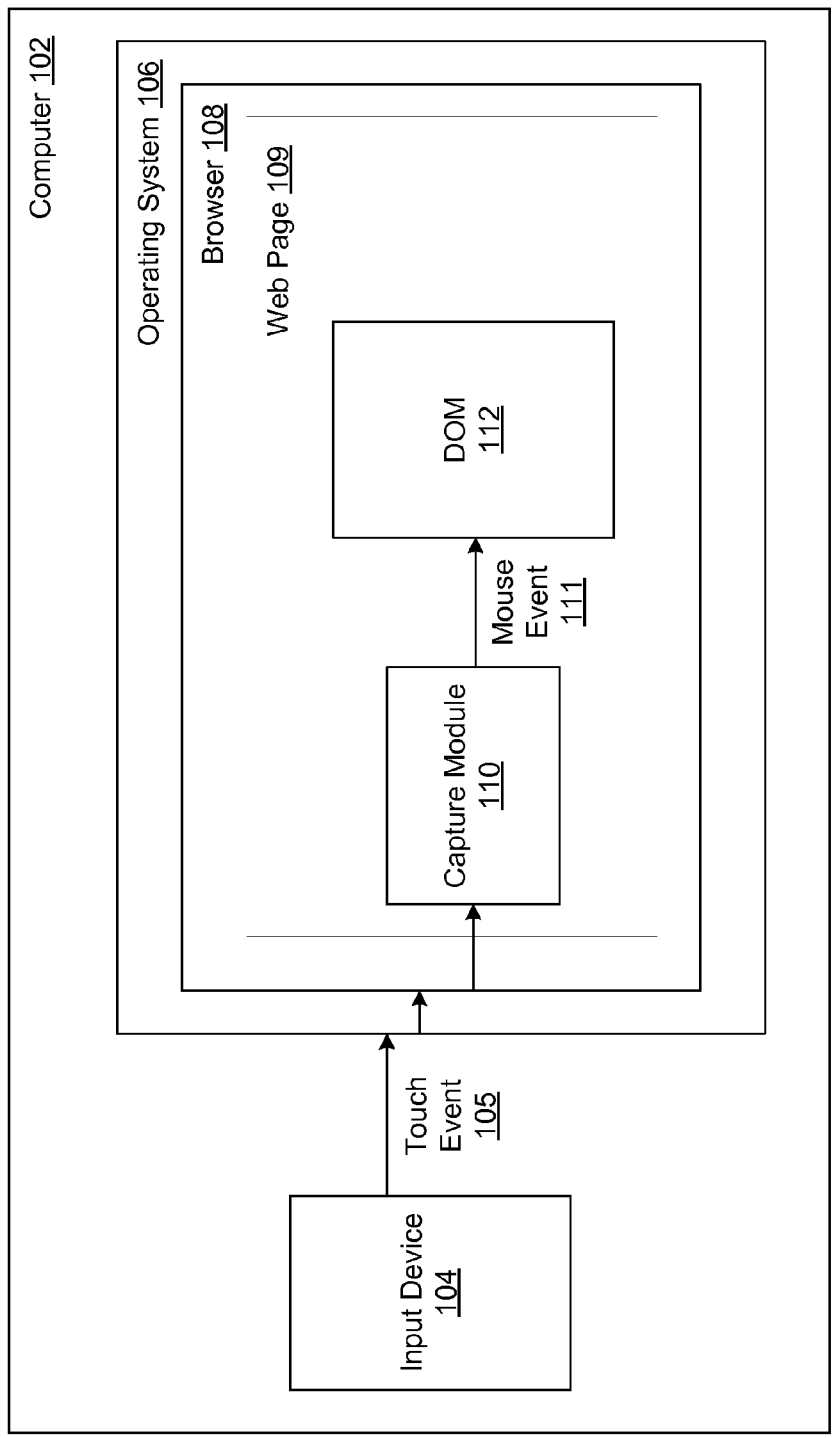

FIG. 1 is a high-level block diagram that illustrates a computer 102 used to translate user input events according to one embodiment of the present disclosure. As shown, the computer 102 includes a touch-sensitive input device 104, an operating system 106, a browser 108, a web page 109 rendered by the browser, and a capture module 110 and document object model (DOM) 112 within the web page.

The computer 102 is an electronic device used by a user to perform tasks such as retrieving and viewing web pages hosted over a network, play music, etc. For example, the computer may be a mobile telephone, tablet computer, a laptop computer, or a desktop computer. Thus, as used herein the term "computer" encompasses a wide variety of computing devices.

The computer 102 includes a touch-sensitive input device 104 that generates touch events 105 responsive to user inputs. A touch-sensitive input device 104 is an electronic input system wherein a user can use his or her fingers, a stylus, and/or another object to provide user inputs. In one embodiment, the input device 104 includes a touch-sensitive display screen wherein a user can provide inputs by directly touching the touch-sensitive display screen. The input device generates touch events 105 based on the touch inputs received from the user.

The touch events 105 describe user inputs provided by the user using the touch-sensitive input device 104. Examples of touch input events generated by the touch-sensitive input device 104 include touch start, touch move, touch end, touch cancel, etc. In one embodiment, the computer 102 sends the touch events 105 to the operating system 106 executing on the computer 102.

The operating system 106 receives the touch events 105 and dispatches the touch events 105 to appropriate applications executing on the computer 102. The operating system 106 manages computer resources and provides common services enabling efficient execution of applications on the computer 102. Examples of the operating system 106 include variants of GOOGLE ANDROID, APPLE IOS, MICROSOFT WINDOWS, and LINUX. If the browser 108 has focus when a touch event 105 is received, the operating system 106 directs the touch event to the browser.

The browser 108 is an application executing on the computer 102 and is typically used for retrieving and presenting resources accessed over a network. In one embodiment, the browser 108 is a web browser displaying a web page 109 retrieved from a web server via a network. Examples of the browser 108 include, for example, GOOGLE CHROME, MOZILLA FIREFOX, APPLE SAFARI, and MICROSOFT INTERNET EXPLORER.

The browser 108 renders a web page 109. The web page is a document retrieved by the browser 108 over a network and/or from a local source that typically displays information to the user of the computer 102. In one embodiment, the web page 109 includes one or more objects represented and interacted with according to a document object model (DOM) 112. The browser 108 passes touch events received from the operating system 106 to objects in the web page 109 according to the DOM 112. The browser 108 may also generate mouse events based on the touch events and also pass these mouse events to the web page objects according to the DOM 112.

The objects on the web page 109 can include, for example, the entire page and buttons, images, and text fields within the page. The objects can have associated scripts (e.g., JAVASCRIPT scripts) that the browser 108 executes when the web page 109 is rendered. The scripts implement event handlers that register for events passed to the objects. Thus, the scripts receive the events of the registered-for types that are sent to their associated objects. Assume for purposes of this discussion that the scripts of the web page objects implement event handlers for mouse events, but not for touch events.

The web page 109 includes a capture module 110 that intercepts events 105 received by the browser 110 and translates received touch events to mouse events 111. In one embodiment, the capture module 110 is written in JAVASCRIPT or another scripting language and is thus executed automatically by the browser 108 when the web page 109 is rendered. Other embodiments of the capture module 110 can be written using different types of languages, and integrated into the browser 108, operating system 106, or another component of the computer 102.

The capture module 110 registers event handlers at the "document" level of the DOM. This is the highest level and the capture module's event handlers thus receive events prior to the events being received by any other objects' input handlers. Upon receiving a touch event, the capture module 110 stops propagation of the touch event 105 to the DOM 112. Additionally, the capture module 110 translates the touch event (or events) to an equivalent mouse event. The capture module 110 sends translated mouse events to the web page 109 according to the DOM 112. An embodiment of the capture module 110 also receives mouse events generated by the browser 108 and selectively filters those mouse events.

The capture module 110 thus provides improved operation of web pages having objects designed for mouse-based interactions on computers 102 having touch-sensitive input devices 104. The capture module 110 is distributed to the computers 102 as part of the web page and, therefore, the capture module allows for uniform event handling across a variety of computers having different types of input devices. Moreover, because the capture module 110 is associated with a specific web page or group of web pages, it can use knowledge of users' typical interactions with the web page to inform the translation process. The capture module 110 accordingly improves the users' interactions with the web page relative to browsers 108 that lack the capture module.

Figure 2:
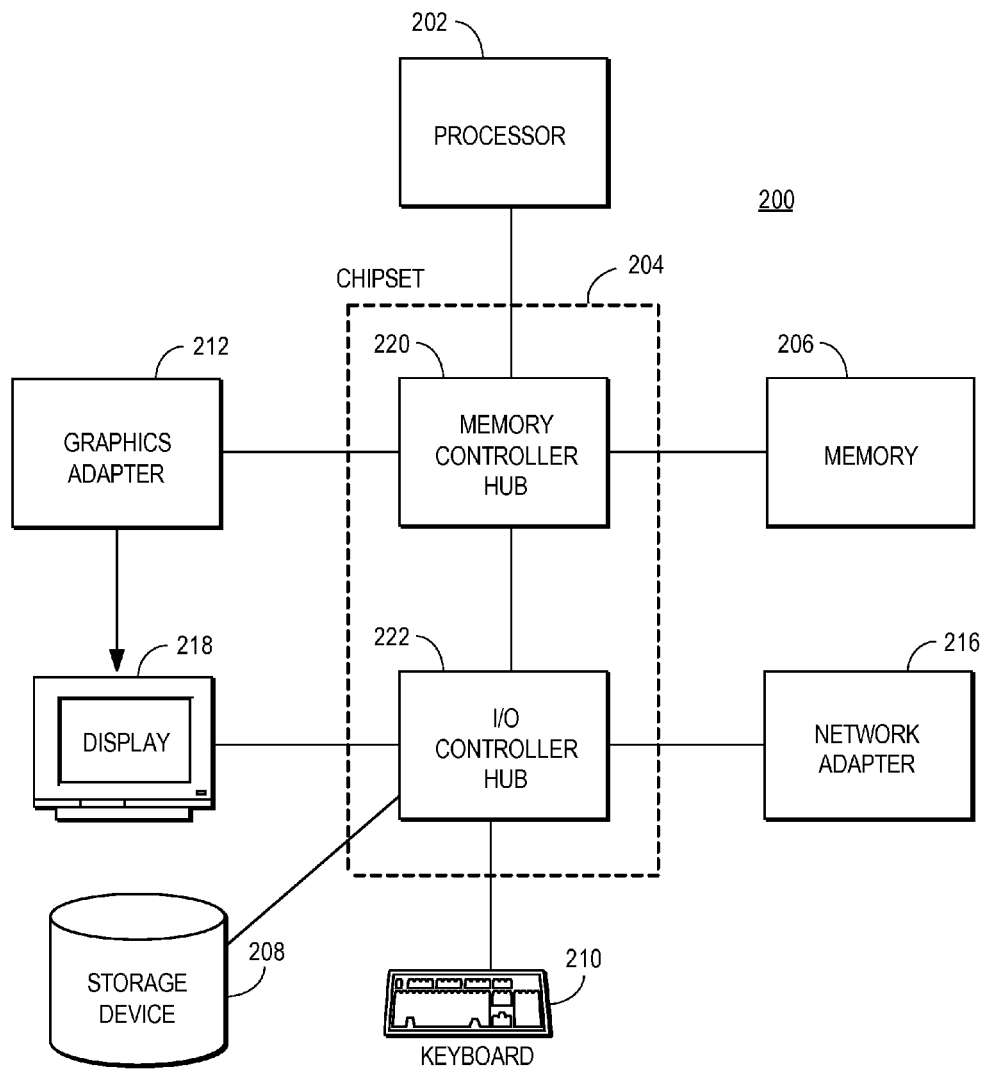
FIG. 2 is a high-level block diagram illustrating an example of a computer according to one embodiment of the present disclosure.

FIG. 2 is a high-level block diagram illustrating an example of a computer 102 according to one embodiment of the present disclosure. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213 and the I/O controller hub 255. A storage device 208, keyboard 210, and network adapter 216 are also coupled to the I/O controller hub 255. Other embodiments of the computer 102 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. In some embodiments, the display device 218 is a touch-sensitive display. The display device 218 can be used alone or in combination with the keyboard to input data to the computer 102. The graphics adapter 213 displays images and other information on the display device 218. The network adapter 216 couples the computer 102 to a network. Some embodiments of the computer 102 have different and/or other components than those shown in FIG. 2.

The computer 102 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
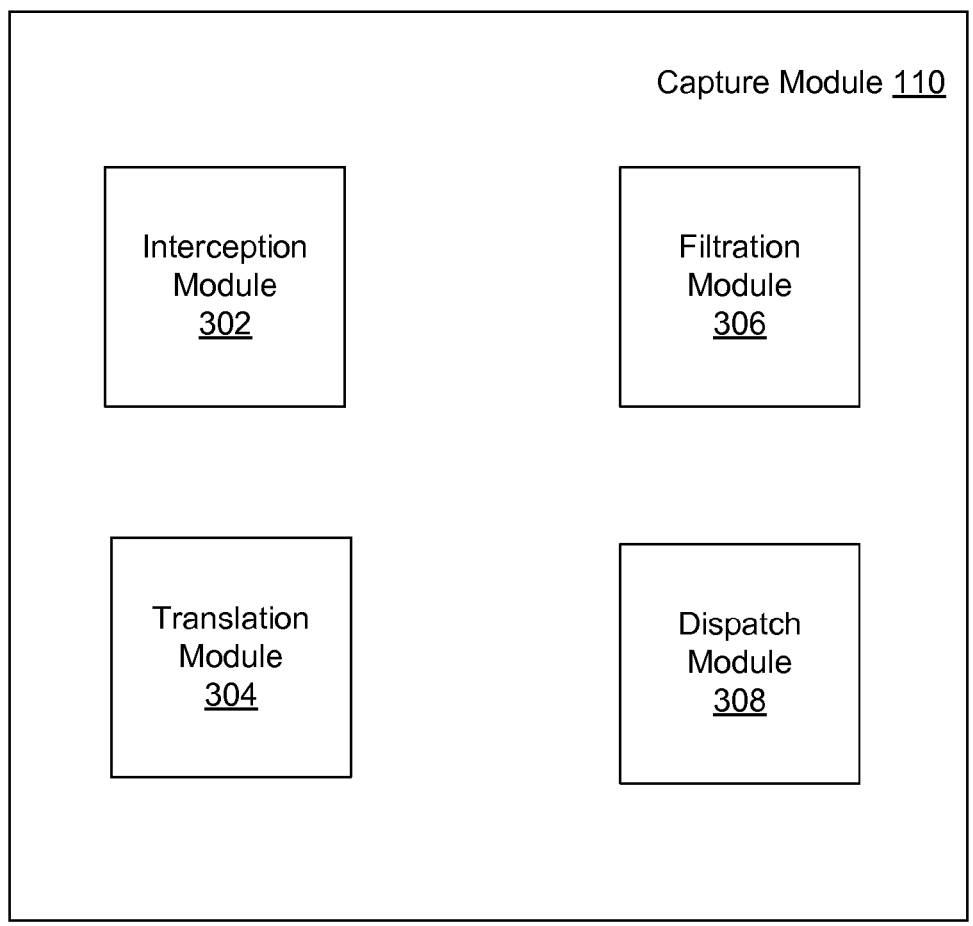
FIG. 3 is a high-level block diagram illustrating modules within the capture module according to one embodiment of the present disclosure.

FIG. 3 is a high-level block diagram illustrating modules within the capture module 110 according to one embodiment of the present disclosure. Those of skill in the art will recognize that other embodiments can have different and/or other modules than the ones described here, and that the functionalities can be distributed among the modules in a different manner. As shown in FIG. 3, the capture module 110 includes an interception module 302, a translation module 304, a filtration module 306, and a dispatch module 308.

The interception module 302 intercepts events dispatched to the web page 109 by the browser 108. These events include touch events 105 sent to the browser 108 by the operating system 106, mouse events dispatched to the web page 109 by the browser based on the touch events, and translated events dispatched by the dispatch module 308 as part of the operation of the capture module 110. In one embodiment the interception module 302 registers touch and mouse event handlers at the highest level of the DOM 112, the document level. The registration at the document level allows the interception module's event handlers to receive the events prior to the events being received by event handlers registered by other objects on the web page 109.

Furthermore, the event handlers are configured to stop propagation of received events. Specifically, the event handlers stop the events from propagating through the DOM 112 for the web page. Thus, the interception module 302 may preferably be the only entity on the web page 109 that receives events from the browser 108.

The interception module 302 sends the intercepted events to other modules within the capture module 110. In one embodiment, the interception module 302 sends intercepted touch events to the translation module 304. The interception module 302 sends intercepted mouse events, in contrast, to the filtration module 306.

The translation module 304 receives intercepted touch events 105 from the interception module 302 and translates the touch events to mouse events. In general, the translation module 304 generates mouse events equivalent to the intercepted touch events 105. For example, in one embodiment touch start, touch move and touch end events are translated to mouse down, mouse move and mouse up events respectively. The particular translations performed by the translation module 304 may be configured to optimize user interactions with the web page 109 using the touch-sensitive input device 104. Moreover, the types of translations can vary in different embodiments based on, for example, characteristics of the computer 102 and/or input device 104, the browser 108, and the web page 109.

In one embodiment, the translation module 304 analyzes characteristics of a combination of touch events and produces one or more mouse events based on the combination of touch events. Thus, the translation between touch events 105 and mouse events need not be a one-to-one mapping; multiple touch events can be translated to one mouse event and vice-versa. For instance, if the translation module 304 detects successive touch start and touch end events indicating a double tap gesture, the translation module can generate a single mouse event indicating a "zoom in" command. In another instance, if the translation module 304 detects a touch start event which is not followed by a touch end event within a pre-determined period of time, indicating a touch hold gesture, the translation module 304 can generate a right click mouse event or an equivalent mouse event for generating a context menu.

The translation module 304 marks the mouse events it generates to indicate that the mouse events are based on translated touch events. This marking serves to distinguish mouse events generated by the translation module 304 from "native" mouse events generated by the browser 108 and/or other sources. In one embodiment, the translation module 304 marks the generated mouse events by setting a property of the mouse events to reflect that the mouse events resulted from translation. For example, it can set an "event.translated" property equal to "true."

The translation module 304 dispatches the translated mouse events to the web page 109. As a result, the mouse events are captured by the capture module 110. As discussed above, the interception module 302 intercepts the translated mouse events 302. The interception module 302 sends the translated mouse events to the filtration module 306 along with any other intercepted mouse events.

The filtration module 306 selectively filters mouse events and cancels (stops propagation) of any filtered mouse events (i.e., of mouse events that do not pass through the filter). In one embodiment, the filtration module 306 passes all mouse events marked as "translated" through the filter. For native (i.e., non-translated) mouse events, the filtration module 306 analyzes characteristics of the mouse events to determine whether to pass them through the filter.

The filtration module 306 determines whether to filter native mouse events based on the web page objects targeted by the mouse events. In one embodiment, the filtration module 308 does not filter mouse events that are directed to certain types of objects, including text field, combo box, and submit button objects. These types of objects have standardized behaviors and therefore native mouse events generated by the browser 108, for example, are allowed to pass through the filtration module 306. For example, the user pressing the "enter" key on a keyboard or user interface can result in the browser 108 sending a mouse click event to a submit button and it is undesirable to filter this type of event. In addition, certain actions do not generate touch events. In such cases the filtration module 306 does not filter native mouse events since no translated mouse events are generated. The filtration module 306 filters native mouse events not directed to these types of objects and/or otherwise having characteristics indicating that the events should be filtered.

The dispatch module 308 receives the mouse events that pass through the filtration module 306 and dispatches them to the web page 109. In an embodiment, the dispatch of mouse events includes permitting the mouse events that pass through the filtration module 306 to continue propagating through the web page uninterrupted. As discussed above, these mouse events include translated mouse events generated by the translation module 304 and native mouse events having certain characteristics allowing the events to pass through the filtration module 306. The dispatch module 308 dispatches the mouse events to the appropriate objects on the web page 109. Thus, the event handlers registered for that object receive the mouse event and can react accordingly.

Figure 4:
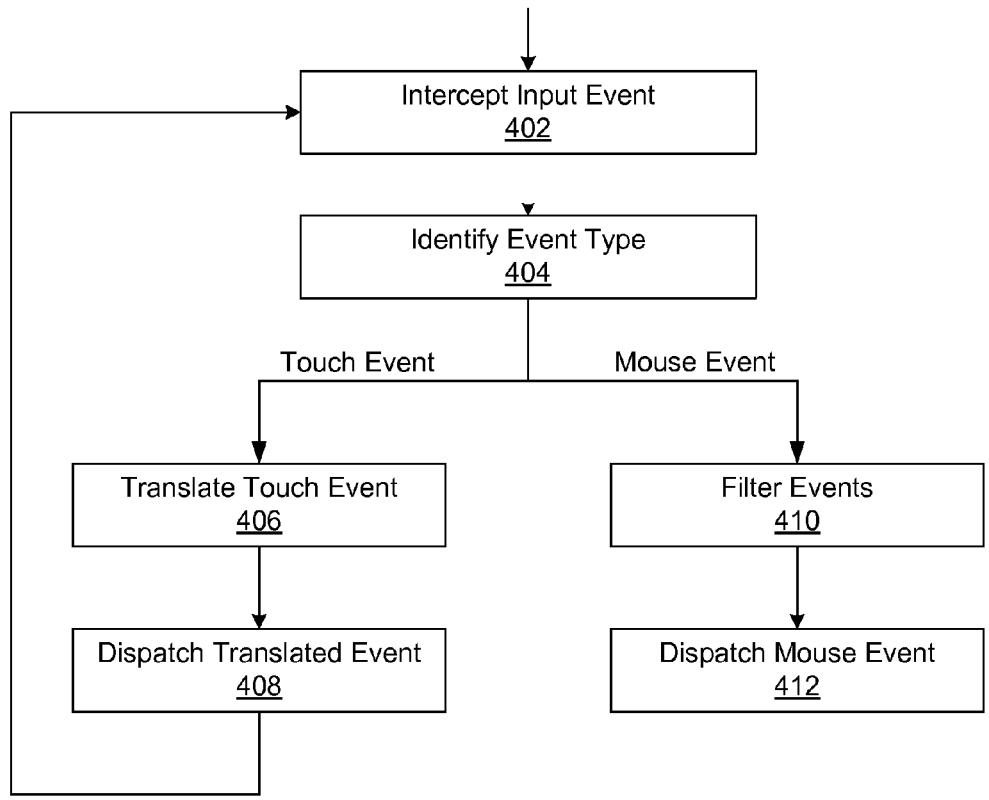
FIG. 4 is a flow chart illustrating the operation of the capture module according to one embodiment of the present disclosure.

FIG. 4 is a flow chart illustrating the operation of the capture module 110 according to one embodiment of the present disclosure. In one embodiment, the capture module 110 intercepts 402 an input event sent by the browser 108 to the DOM 112 of the web page. The input event may be, for example, a touch event that originated at an input device 104 of the computer 102. The input event may also be a native mouse event created by the browser 108 based on a touch event. Additionally, the input event may be a translated mouse event generated by the capture module 110 based on one or more previous touch events.

The capture module 110 identifies 404 the type of event it intercepted. That is, the capture module 110 analyzes the intercepted input event 402 to determine whether it is a touch event or a mouse event. If the capture module 110 identifies 404 the input event as a touch event, it translates 406 the touch event into a translated mouse event. The capture module 110 dispatches 408 the translated event to the DOM 112 of the web page 109, where it is again intercepted by the capture module.

If the capture module 110 identifies 404 the input event as a mouse event, the capture module selectively filters 410 the mouse event based on the event's characteristics. If the mouse event is a mouse event translated from a capture event by the capture module, the capture module passes the mouse event through the filter. Additionally, if the mouse event is a native (non-translated) mouse event, the capture module 110 passes the event through the filter if it is directed to certain types of web page objects, such as a text field, combo box, or submit button. Otherwise, the capture module filters out (cancels) the mouse event.

The capture module 110 dispatches 412 mouse events that pass through the filter to the web page objects to which the events were originally directed. As described in the specification above, dispatch 412 of mouse events includes permitting the mouse events to continue propagating to an object. Thus, the mouse events interact with the objects embedded in the web page 109. Accordingly, the capture module 110 provides optimized touch-based user interaction with web pages having objects designed for mouse-based interactions.

While the techniques described above focus on translation of touch input events to mouse input events, the techniques can be used to translate any type of input event to any other type of event. Thus, one or more input events of a first type may be translated to one or more events of a second type. Additionally, the techniques described above can be used to translate events for applications other than web browsers.

The above description is included to illustrate the operation of certain embodiments and is not meant to limit the scope of the invention. From the above discussion, many variations will be apparent to one skilled in the relevant art that would yet be encompassed by the spirit and scope of the invention.

What is claimed is:

1. A computer-implemented method of translating a first type of input event to a second type of input event, the method comprising:
    receiving an input event directed to an object of an application executing on a computer, the input event generated responsive to a user interaction with an input device of the computer;
    responsive to the input event being of the first type, translating the input event of the first type to an input event of the second type;
    marking the input event of the second type as a translated event;
    selectively filtering the input event of the second type, wherein the selective filtering passes events of the second type marked as translated through a filter; and
    dispatching the input event of the second type to the object of the application responsive to the filtering.

2. The method of claim 1, wherein the first type of input event is a touch input event and the second type of input event is a mouse input event.

3. The method of claim 1, wherein the application is a browser and receiving an input event directed to an object of an application comprises:
    receiving an input event directed to a document object model of a web page rendered by the browser.

4. The method of claim 3, further comprising:
    responsive to the input event being of the first type, stopping propagation of the input event of the first type to the document object model of the web page.

5. The method of claim 1, wherein translating the input event of the first type to an input event of the second type comprises:
    translating the input event of the first type to an equivalent input event of the second type.

6. The method of claim 1, wherein translating the input event of the first type to an input event of the second type comprises:
    analyzing characteristics of a plurality of input events of the first type; and
    translating the plurality of input events of the first type to one or more input events of the second type responsive to the characteristics.

7. The method of claim 1, wherein selectively filtering the input event of the second type comprises:
    determining whether to cancel the input event of the second type responsive to the object of the application to which the input event of the second type is directed;
    wherein a canceled input event is not dispatched to the object.

8. The method of claim 7, wherein the input event of second type is not canceled and propagates to the object responsive to the input event of the second type being directed to a text field object, a combo box object, or a submit button object.

9. A computer for translating a first type of input event to a second type of input event, the computer comprising:
    a non-transitory computer-readable storage medium storing executable computer program code comprising:
        a reception module for receiving an input event directed to an object of an application executing on a computer, the input event generated responsive to a user interaction with an input device of the computer;
        a translation module for translating, responsive to the input event being of the first type, the input event of the first type to an input event of the second type, and for marking the input event of the second type as a translated event;
        a filtration module for selectively filtering the input event of the second type, and for passing events of the second type marked as translated through a filter; and
        a dispatch module for dispatching the input event of the second type to the object of the application responsive to the filtering; and
    a processor for executing the computer program code.

10. The computer of claim 9, wherein the first type of input event is a touch input event and the second type of input event is a mouse input event.

11. The computer of claim 9, wherein the application is a browser and wherein the reception module is adapted to receive an input event directed to a document object model of a web page rendered by the browser.

12. The computer of claim 11, wherein the reception module is further adapted to stop propagation of the input event of the first type to the document object model of the web page responsive to the input event being of the first type.

13. The computer of claim 9, wherein translating the input event of the first type to an input event of the second type comprises translating the input event of the first type to an equivalent input event of the second type.

14. The computer of claim 9, wherein translating the input event of the first type to an input event of the second type comprises:
    analyzing characteristics of a plurality of input events of the first type; and
    translating the plurality of input events of the first type to one or more input events of the second type responsive to the characteristics.

15. The computer of claim 9, wherein selectively filtering the input event of the second type comprises:
- determining whether to cancel the input event of the second type responsive to the object of the application to which the input event of the second type is directed;
- wherein a canceled input event is not dispatched to the object.

16. The computer of claim 15, wherein the input event of second type is not canceled and propagates to the object responsive to the input event of the second type being directed to a text field object, a combo box object, or a submit button object.

17. A non-transitory computer-readable medium storing executable computer program instructions for translating a first type of input event to a second type of input event, the computer program instructions comprising:
- a reception module for receiving an input event directed to an object of an application executing on a computer, the input event generated responsive to a user interaction with an input device of the computer;
- a translation module for translating, responsive to the input event being of the first type, the input event of the first type to an input event of the second type, and for marking the input event of the second type as a translated event;
- a filtration module for selectively filtering the input event of the second type, and for passing events of the second type marked as translated through a filter; and
- a dispatch module for dispatching the input event of the second type to the object of the application responsive to the filtering.

18. The computer-readable medium of claim 17, wherein the first type of input event is a touch input event and the second type of input event is a mouse input event.

19. The computer-readable medium of claim 17, wherein the application is a browser and wherein the reception module is adapted to receive an input event directed to a document object model of a web page rendered by the browser.

20. The computer-readable medium of claim 17, wherein the reception module is further adapted to stop propagation of the input event of the first type to the document object model of the web page responsive to the input event being of the first type.

21. The computer-readable medium of claim 17, wherein translating the input event of the first type to an input event of the second type comprises translating the input event of the first type to an equivalent input event of the second type.

22. The computer-readable medium of claim 17, wherein translating the input event of the first type to an input event of the second type comprises:
- analyzing characteristics of a plurality of input events of the first type; and
- translating the plurality of input events of the first type to one or more input events of the second type responsive to the characteristics.

23. The computer-readable medium of claim 17, wherein selectively filtering the input event of the second type, comprises:
- for determining whether to cancel the input event of the second type responsive to the object of the application to which the input event of the second type is directed; and
- wherein a canceled input event is not dispatched to the object.

24. The computer-readable medium of claim 23, wherein the input event of second type is not canceled and propagates to the object responsive to the input event of the second type being directed to a text field object, a combo box object, or a submit button object.

\* \* \* \* \*